United States Patent [19]
Maus et al.

[11] Patent Number: 5,751,602
[45] Date of Patent: May 12, 1998

[54] METHOD OF MONITORING THE OPERATION OF A CATALYTIC CONVERTER

[75] Inventors: Wolfgang Maus; Helmut Swars; Rolf Brück, all of Bergisch Gladbach, Germany

[73] Assignee: Emitec Gesellschaft Fuer Emissiontechnologie mbH, Lohmar, Germany

[21] Appl. No.: 789,488

[22] Filed: Jan. 27, 1997

Related U.S. Application Data

[62] Division of Ser. No. 390,676, Feb. 17, 1995, Pat. No. 5,610,844.

[30] Foreign Application Priority Data

Aug. 17, 1992 [DE] Germany .......................... 42 27 207.6
Jun. 16, 1993 [DE] Germany .......................... 43 19 924.0

[51] Int. Cl.$^6$ ........................................ F01N 3/20
[52] U.S. Cl. .................. 364/557; 701/103; 60/274; 60/277; 60/286
[58] Field of Search ..................... 364/557, 496, 364/431.051, 431.08; 60/274, 277, 285, 286, 287; 73/118.1

[56] References Cited

U.S. PATENT DOCUMENTS

| | | | |
|---|---|---|---|
| 3,957,444 | 5/1976 | Goto et al. | 60/277 |
| 4,597,262 | 7/1986 | Retallick | 60/274 |
| 4,656,829 | 4/1987 | Creps et al. | 60/277 |
| 4,672,809 | 6/1987 | Cornelison et al. | 60/286 |
| 5,060,473 | 10/1991 | Nakagawa | 60/277 |
| 5,133,184 | 7/1992 | Geiger | 60/274 |
| 5,177,463 | 1/1993 | Bradshaw et al. | 60/274 |
| 5,255,511 | 10/1993 | Maus et al. | 60/274 |
| 5,303,168 | 4/1994 | Cullen et al. | 364/557 |
| 5,307,626 | 5/1994 | Maus et al. | 60/274 |
| 5,339,628 | 8/1994 | Maus et al. | 60/277 |
| 5,355,671 | 10/1994 | Maus et al. | 60/274 |
| 5,428,956 | 7/1995 | Maus et al. | 60/277 |
| 5,474,746 | 12/1995 | Maus et al. | 422/174 |

FOREIGN PATENT DOCUMENTS

| | | |
|---|---|---|
| 2643739 | 3/1978 | Germany . |
| 4100397 | 8/1991 | Germany . |
| 4032721 | 4/1992 | Germany . |
| 4120196 | 12/1992 | Germany . |

OTHER PUBLICATIONS

SAE Technical Paper Series 930624, Detroit, Michigan, Mar. 1–5, 1993, "Thermal Measurements Inside a Three-Way Catalytic Converter on Engine Bench" (Germidis).

SAE Technical Paper Series 930938, Detroit, Michigan, Mar. 1–5, 1993, "A Linear Catalyst Temperature Sensor for Exhaust Gas Ignition (EGI) and On Board Diagnostics of Misfire and Catalyst Efficiency" (Collings et al.).

*Primary Examiner*—James P. Trammell
*Assistant Examiner*—Eric W. Stamber
*Attorney, Agent, or Firm*—Herbert L. Lerner; Laurence A. Greenberg

[57] ABSTRACT

A method for analyzing a condition of at least one partial volume of a catalytic converter through which a gas mixture flows, includes measuring a temperature with a sensor at least at one location or in a region within a partial volume during a change of chemical and/or physical properties of the gas mixture. The location or the region and a configuration of the sensor are selected in such a way that a reaction of the measured temperature to a change of the properties of the gas mixture is at least approximately representative of a reaction of the temperature in the partial volume of the catalytic converter. Set point values are determined for the respective change in the properties of the gas mixture on the basis of a thermodynamic model while taking physical boundary conditions and properties of the partial volume into account. The reaction of the measured temperature is determined and compared with the set point values.

32 Claims, 2 Drawing Sheets

METHOD OF MONITORING THE OPERATION OF A CATALYTIC CONVERTER

CROSS-REFERENCE TO RELATED APPLICATION

This application is a division of application Ser. No. 08/390,676, filed Feb. 17, 1995, now U.S. Pat. No. 5,610,844, which was a Continuation of International Application Ser. No. PCT/EP93/02150, filed Aug. 12, 1993.

BACKGROUND OF THE INVENTION

1. Field of the Invention

The present invention relates to a method for analyzing a condition of at least a partial volume of a catalytic converter through which a gas mixture flows, in particular for monitoring an operation of a catalytic converter placed downstream of an electronically controlled internal combustion engine. The main fields of use for the invention are catalytic converters as well as so-called precatalysts disposed next to engines of passenger cars with Otto engines. In connection with increasingly more stringent world-wide laws for the reduction of noxious matter emissions from motor vehicles with internal combustion engines, it also becomes increasingly necessary to monitor the operation of a catalytic converter installed downstream of an internal combustion engine continuously or at intervals in order to obtain information regarding its condition, its effectiveness and, if possible, its remaining service life. Such monitoring is to be performed at opportune times in the course of operation and is therefore identified by the abbreviation OBD (on-board diagnosis).

Numerous methods for monitoring the operation of a catalytic converter which are known from the prior art, make use of various physical and chemical effects. First, it is possible to measure the oxygen content of the exhaust gas ahead of and behind the catalyst by means of so-called lambda probes. In the process it is possible to draw conclusions regarding the operation of the catalytic converter from a reduction in oxygen content between two probes. Another physical principle makes use of the fact that the processes occurring in the catalytic converter are exothermal reactions, which release heat energy. In the simplest case it is therefore possible to draw conclusions regarding the effectiveness of the catalytic converter from the temperature difference between temperature sensors between which at least a large portion of the catalytically active volume is located. Such a method and the associated device are described in Published International Application WO 91/14855, corresponding to U.S. Pat. Nos. 5,255,511 and 5,307,626, for example. Suitable sensors by means of which temperature measurements can be performed in a catalytic converter are described in that reference and also in Published International Application WO 93/05284, corresponding to U.S. Pat. No. 5,474,746. In principle it is necessary in connection with temperature measurements in the exhaust system of an internal combustion engine to distinguish between measurements of the gas temperature and measurements of the structural temperature of the catalytic converter. The structure of a catalytic converter supporting the catalytically active mass on its surface absorbs energy from an exothermal reaction on the catalytically active surface much faster than the exhaust gas flowing over it. The temperature measurement therefore takes place at the heat source, so to speak, and during transient processes reacts considerably faster and more accurately than the gas temperature in many cases. However, the gas temperature shows similar reactions, although delayed and/or weakened, so that measurements which can be evaluated are not only possible to be taken at the structure, but within limitations also inside the catalytic converter in the exhaust gas itself.

A measuring method is furthermore known from German Published, Non-Prosecuted Application DE 41 00 397 A1, corresponding to U.S. Pat. No. 5,133,184, wherein the condition of an internal combustion engine is briefly disrupted, particularly by turning off the ignition and injecting gasoline during operation under load, in the course of which the reaction of temperature sensors at various places in the exhaust system is observed. In this connection it is also suggested to differentiate the temperature signals and to store the differentiated signals or to compare those signals with already stored previous signals.

The following basic problems occur during temperature measurement in the exhaust system, in particular inside catalytic converters: On one hand, the occurring absolute temperatures are so high that it is impossible to measure the absolute temperatures with sufficient accuracy with conventional, economically usable temperature sensors in order to draw dependable conclusions therefrom. In particular, when forming the difference between several temperature sensors, the measuring errors are cumulative so that because of the measuring errors it is no longer possible to detect the changes, which are small per se, with certainty. A further problem lies in the fact that the values measured by a temperature sensor inside a catalytic converter depend to a large extent on the location where the sensor has been installed. If, for example, a temperature sensor is installed close to the beginning of an approximately 20 cm long catalytic converter, after a short time in operation this sensor can be located in a catalytically less active zone, so that the values measured there can provide practically no further information regarding the operational ability of the remaining catalyst volume. On the other hand, during transient processes, particularly during brief disruptions of the operational condition of the internal combustion engine with a catalyst which has only been briefly operational, a temperature sensor installed at the end of the catalytic converter would measure practically no change at all, since the entire exothermal reaction occurs in the front portion of the catalytic converter, so that brief changes cannot be detected at all or can only be detected belatedly and are greatly weakened at the end of the catalytic converter, because of the heat capacity of the portion located behind it. The situation becomes even more difficult in connection with the frequent cases wherein a catalytic converter is formed of several partial bodies disposed one behind the other. In this case the meaningfulness of a measured temperature value obtained at any arbitrary location is very small in relation to the total condition of the system.

SUMMARY OF THE INVENTION

It is accordingly an object of the invention to provide a method of monitoring the operation of a catalytic converter and more particularly a method for the analysis of the condition of a partial volume of a catalytic converter through which a mixture of gases flows, which overcomes the hereinafore-mentioned disadvantages of the heretofore-known methods of this general type and which, by itself or together with the analyses of the condition of further partial volumes, provides dependable information regarding the total condition of a catalytic converter. In this regard, the invention is based on the knowledge that the condition of a catalytic converter and its behavior under operational conditions can be very well described by means of simple models and that only a few physical values are required for the mathematical equations for describing such a model.

Some basic reflections can be found in the document SAE Technical Paper Series 930938, entitled "A Linear Catalyst Temperature Sensor for Exhaust Gas Ignition (EGI) and On Board Diagnostics of Misfire and Catalyst Efficiency" by Nick Collings et al., and from the document SAE Technical Paper Series 930624, entitled "Thermal Measurements Inside a Three-Way Catalytic Converter on Engine Bench" by Angelo Germidis et al.

The invention of the instant application therefore proceeds from the reflection that theoretically a catalyst volume can be divided into two or more successive partial volumes, and that these partial volumes must be considered separately or in correlation.

With the foregoing and other objects in view there is provided, in accordance with the invention, a method for analyzing a condition of at least one partial volume of a catalytic converter through which a gas mixture flows, which comprises measuring a temperature with a sensor at least at one location or in a region within a partial volume of a catalytic converter during a change of at least one of chemical and physical properties of a gas mixture flowing through the catalytic converter; selecting the location or the region and a configuration of the sensor for at least approximately representing a reaction of the temperature in the partial volume of the catalytic converter with a reaction of the measured temperature to a change of the properties of the gas mixture; determining set point values for the respective change in the properties of the gas mixture on the basis of a thermodynamic model while taking physical boundary conditions and properties of the partial volume into account; and determining and comparing the reaction of the measured temperature with the set point values.

In accordance with another mode of the invention, the derivative with respect to time of the measured temperature is observed as the reaction, wherein it is intended to be at least approximately representative of the chronological change of the temperature in the partial volume of the catalytic converter, and wherein furthermore the derivative with respect to time of the measured temperature is determined and compared with set point values for the respective change of the properties of the gas mixture. In particular, the height of the maximum of the derivative with respect to time of the measured temperature during a change in the exhaust gas composition in comparison to previously measured maxima with the same changes or in comparison to set point values, is very meaningful.

In accordance with a further mode of the invention, there is provided a method which comprises observing the integral of the temperature with respect to time over the period of the respective change of the exhaust gas composition. In the course of this observation it may be necessary to take into consideration a time delay of the reaction in the catalytic converter with respect to the exhaust gas composition. It is also, of course, necessary to subtract the quasi-constant temperature portion of the temperature measured before and after the change, from the integral. Figuratively speaking, the result then is the area below the temperature peak which is triggered by the change at the temperature sensor.

Since a motor vehicle is almost constantly subjected to transient operational conditions, it can be difficult to assign measured temperature changes to changes in the exhaust gas composition in order to draw conclusions regarding the condition of the catalytic converter.

For this reason, in accordance with an added mode of the invention, the two or more changes are imprinted on the exhaust gas in a typical, recognizable sequence, i.e. a change pattern.

In accordance with an additional mode of the invention, the imprinting of the change pattern takes place periodically, aperiodically or selectively and also with changes (amplitudes) of different strengths.

In accordance with yet another mode of the invention, the change pattern differs from all conceivable operationally caused changes, so that the temperature change at the sensor can be assuredly associated with the imprinted change pattern of the exhaust gas composition. Particular frequencies, which are so low that they can be barely detected by the sensors and lie below the typical, operationally connected change frequencies, are particularly suitable in connection with periodic change patterns. On the other hand, the frequencies must be sufficiently high to permit a sufficient number of changes within a short period of time at constant operational conditions (load, idle).

In accordance with yet a further mode of the invention, the change pattern has frequencies of 0.1 to 10 Hz, and in particular 0.5 to 2 Hz.

Further advantageous embodiments of the invention are described in the remaining dependent claims.

In general, when new, a catalytic converter is oversized for all operational states. This means that more than 90% of all noxious matter are already converted within the first few centimeters in the converter. In the course of the aging of the catalyst with increasing operating time, the efficiency in the front part of the catalytic converter decreases, for example by poisoning and/or thermal aging. Thus it is not possible to conclude from the fact that a temperature sensor disposed further back hardly shows a change in its measured values during a brief disruption that the catalytic converter does not fulfill its function. On the other hand, in the case of an aged catalytic converter wherein a temperature sensor disposed very near the front hardly shows a reaction to a disruption of the operational condition of the internal combustion engine, it can also not be concluded that in its remaining volume the catalytic converter does not completely do its job. Added to this is the fact that all sensors in a motor vehicle, those for engine control as well as those for monitoring the catalytic converter, make measurement errors because of technical production tolerances and aging, and that furthermore a catalytic converter can also have considerable tolerances in its production and installation, particularly with respect to the catalytically active layers. Thus, the evaluation of individual, measured temperature values, their differentiated or integrated signals or also differences between the values measured by temperature probes, contain such large errors that an exact evaluation is hardly possible. The definition of threshold values from which a faulty operation of the catalytic converter can be deduced when they are reached, in particular is very problematic.

The present invention solves this problem particularly advantageously by a theoretical division of the catalytic converter into two or more partial areas and the observation of the reaction of the temperatures in at least one of these partial areas during changes of the chemical and/or physical properties of the gas mixture flowing through the catalytic converter, i.e. the operational condition of the internal combustion engine. However, preferably the observed differentiated or integrated signals or their differences are not compared with fixed threshold values, but with theoretical set point value ranges or those determined by previous testing. In this case, for measurements in two or more partial volumes, in the course of the determination of the set point value ranges of the second partial volume and all subsequent partial volumes, the actually measured values in all preceding partial volumes are taken into consideration, since otherwise the image regarding the operational ability of the catalytic converter remains incomplete.

With catalytic converters of greater length in particular, it is especially advantageous if the temperature is measured, its derivative with respect to time is determined and the comparison with set point value ranges is performed, in at least three partial volumes. Since the present invention operates in a certain way in accordance with the theory of finite elements, the accuracy of the results is a function of the mesh width, i.e. the distance between the individual elements. The result of course becomes all the more accurate with an increase in the partial volumes which are considered and the temperatures which are measured.

In accordance with a concomitant mode of the invention, the set point value ranges are determined by means of a model function which discloses the functional connections of the temperatures in different partial volumes of the catalytic converter with each other and with the data of the electronic control of the internal combustion engine for the respective condition and/or the respective condition change of the internal combustion engine. Measured values, such as mass flow, exhaust gas temperature, air/fuel ratio, etc. are available from the internal combustion engine. It is then possible to draw conclusions regarding a temperature change (for a defined aging condition of the catalyst) to be expected in the first partial volume of the catalytic converter from these values and from the known value of a condition change. In order to compensate for measurement inaccuracies and production tolerances a test is then performed as to whether or not the measured temperature lies within a defined pre-calculated set point value range. This provides the first information regarding the condition of the catalytic converter. With the same information and additionally taking into consideration the measured temperature change in the first partial volume, it is possible to make a prediction of the temperature change to be expected in the second partial volume. In this case too, a check is performed as to whether or not the measured value of the temperature change lies within a tolerance range. This method is continued for all partial volumes. If all measured temperature values lie below the set point value range, the catalytic converter no longer performs its intended functions. The further downstream the measured temperature change value is located in the set point value range, the more the catalytic converter has aged. Assuming that no sudden destruction of the catalytic converter can take place between two measuring processes, it is sufficient to monitor only the reaction in a rear partial volume of the catalytic converter for a change in the condition of the internal combustion engine. If the catalyst is new, a condition change should have little effect there, while with a catalytic converter that has aged to a continuously greater degree, the temperature changes occurring there continue to become greater. However, with only this monitoring it would not be possible to detect a sudden destruction of the catalytic converter (occurring extremely rarely in actuality), rapid poisoning between two measuring processes and especially a worsening of the condition of the front area of the catalytic converter which, among others, is decisive for the cold-starting behavior. Therefore, preferably at least two, but particularly three or more measurements of the temperature changes in different partial volumes are useful for measuring the temperature changes.

If fuel is additionally mixed into the exhaust gas for disruption, care must be taken to ensure that the amount of the fuel as well as the ratio of fuel and air with respect to the entire exhaust gas mass flow are set to a maximum conversion capability in the volume of the catalytic converter during the duration of the disruption and in particular in such a way that the amount of fuel is completely converted over the time of the change and the length of the catalytic converter. In the process, the storage properties of the catalytic converter must be taken into consideration. Measuring signals which are easy to detect are attained in this way and without unburned hydrocarbons being emitted into the environment during the measurement.

Other features which are considered as characteristic for the invention are set forth in the appended claims.

Although the invention is illustrated and described herein as embodied in a method of monitoring the operation of a catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
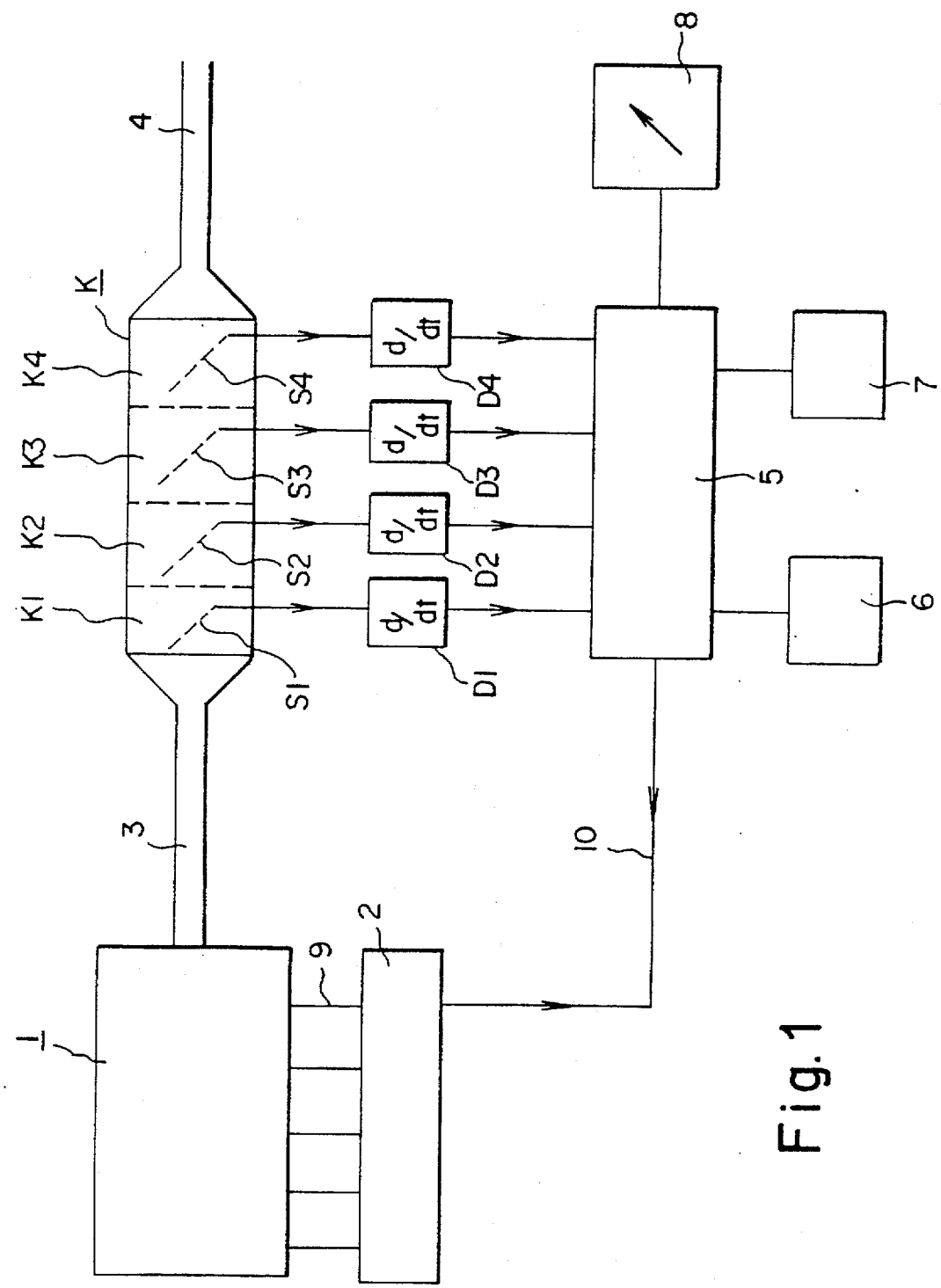
FIG. 1 is a schematic and block circuit diagram of an exemplary embodiment of a configuration suitable for executing the method of the invention.

Referring now to the figures of the drawing in detail and first, particularly, to FIG. 1 thereof, there is seen an exhaust system 3, 4 incorporating a catalytic converter K and being connected downstream of an internal combustion engine 1 with an electronic control 2. The volume of the catalytic converter K includes a plurality of (theoretical) partial volumes, which are four partial volumes K1, K2, K3, K4 in the instant example. A respective sensor S1, S2, S3, S4 which is disposed in each one of the partial volumes approximately representatively measures the temperature in the partial volume, which is preferably the temperature of the support structure. In the simplest case, such a sensor can be in the form of a sensor that measures in a punctiform manner and is located approximately at the center of the respective partial volume K1, K2, K3 or K4. However, it is more advantageous if linear or planar sensors are used, because the accuracy of measurement is increased by their use. It is particularly advantageous if measurements are taken not only representatively over a cross section, but also representatively over the axial length of the partial volume. The measurement is most sensitive if the temperature of the support structure to which the catalytically active mass has been applied is directly measured. This can be done, for example, by means of sensors that are on or integrated into the support structure, such as are known from the prior art.

However, basically a measurement with sensors detecting the gas temperature is also possible, since there is always a heat transfer from the structure and the catalytically active surface to the gas flowing through.

Figure 2:
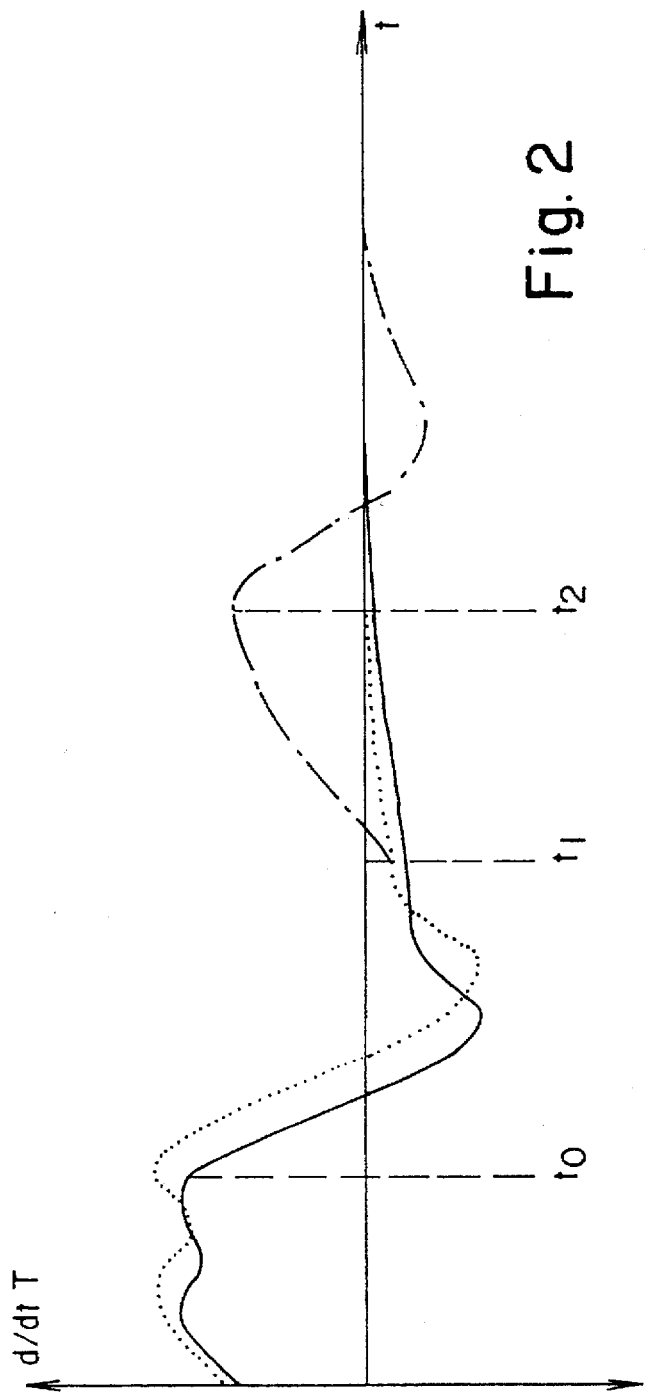
FIG. 2 is a diagram with examples of curves of temperature changes occurring during changes in exhaust gas composition.

By way of example, FIG. 2 shows a diagram wherein the first derivative of the temperature in accordance with the time d/dt T is entered on the vertical axis and wherein the horizontal axis represents the time t. The solid line represents the derivative of the temperature of the gas, the dotted line represents the theoretical temperature at a sensor in the catalytic converter without a change in the gas composition, i.e. without an increase, for example, in the hydrocarbon supply to the catalytic converter, and the dash-dotted line represents the derivative of the temperature at a sensor when supplying additional hydrocarbons to the exhaust gas. In the course of this measurement, the hydrocarbon portions in the exhaust gas are increased at a time $t_1$ until a time $t_2$ during a constant load phase of the internal combustion engine, which starts at a time $t_0$. The reaction of the temperature can be clearly seen and the elevation of the maximum of the temperature increase can also be determined.

Figure 3:
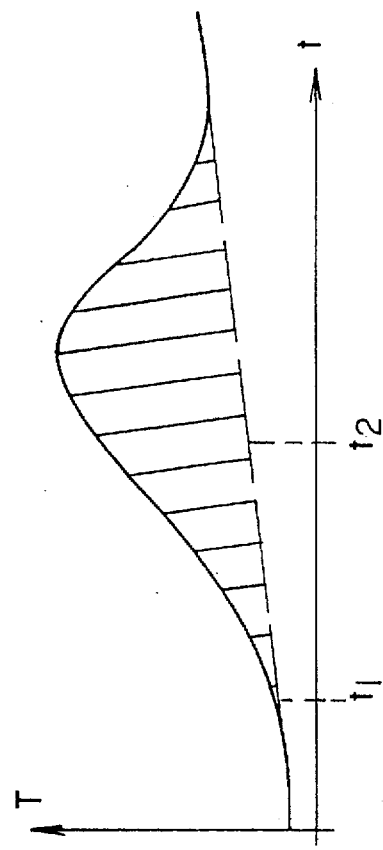
FIG. 3 is a diagram illustrating a chronological temperature integral over the duration of a change.

FIG. 3 shows, by way of example, the conditions or statuses when the integral below a temperature curve (solid line) is determined during a change. In this diagram the temperature T is entered on the vertical axis and the time t on the horizontal axis. The shaded area corresponds to the integral of the temperature over the entire time that the change has an effect, wherein a quasi-constant portion of the temperature, i.e. the area below the theoretically undisturbed temperature curve (dashed line), remains unconsidered.

In contrast to measuring and monitoring methods known from the prior art, the measuring method of the instant invention does not depend on the detection of absolute temperatures or temperature differences between two measuring points. Instead, the derivatives with respect to time of the temperatures measured by the sensors S1, S2, S3, S4, which occur during a change of the physical and/or chemical properties of the gas mixture reaching the catalytic converter K from the engine 1, are observed in one or several of the partial volumes K1, K2, K3, K4. Differentiating devices D1, D2, D3, D4, which are connected downstream of the sensors S1, S2, S3, S4 for this purpose, have output signals that are supplied to an electronic evaluation device 5. The electronic evaluation device 5 can be connected with the electronic engine control 2 through data lines 10, so that it is possible to transmit the data of the engine control 2 to the electronic evaluation device 5 and to transmit the condition values of the catalytic converter K to the electronic engine control 2. The electronic evaluation device 5 is connected to a first memory device 6 for set point value ranges, so that the measured derivatives with respect to time of the temperatures T1, T2, T3, T4 can be compared with set point value ranges. The results of this comparison can be stored in a second memory device 7 for subsequent diagnosis in a special technical location or shop and/or displayed by means of a display 8. It is also possible to employ integrating devices in place of or in addition to the differentiating devices, so that the areas below the temperature curves (without the quasi-constant portion) are also available for evaluation during a change.

A change of the chemical and/or physical properties of the exhaust gases leaving the engine 1 is needed to analyze the condition of the catalytic converter K. In order to perform a useful condition analysis, such a change must be defined with precise accuracy. In the course of this many condition changes occurring in daily operation must be considered, for example an acceleration phase following a phase of constant load, a load reduction following a phase of constant load, cold-starting after prolonged stopping, or the like. It is possible to check various aspects of the operation of the catalytic converter by means of an analysis of the reaction of the derivatives with respect to time of the temperatures T1, T2, T3, T4 to different condition changes. For example, during a cold-starting phase it is possible to determine the start of the catalytic reaction in the catalytic converter K as well as the partial volume in which the first conversion takes place. With other condition changes of the internal combustion engine wherein only the temperature of the exhaust gases, but not their chemical composition changes, for example, it is possible to check whether or not all probes still measure correctly, namely in this case with a time delay from the front to the back.

It is particularly advantageous if the operational condition of the internal combustion engine 1 is briefly disrupted, particularly with a defined change pattern, by means of the electronic control 2 which controls the engine through control lines 9. This can take place, for example, in a manner which is known per se by a brief injection of additional fuel with a simultaneous switching off of the ignition during a load phase. In this case the injection can also take place in accordance with a defined change pattern. The availability of additional chemical energy in the exhaust gas triggers a strong reaction of the temperature in the first still functioning partial volume of the catalytic converter K, having a derivative with respect to time or an integral which can be formed and analyzed by the electronic evaluation device 5.

In contrast to the methods known from the prior art, with the method in accordance with the invention it makes no difference which temperature distribution happens to prevail at the time of measurement. This in particular is a decisive advantage. Depending on the operational conditions through which a motor vehicle has gone prior to a measurement, it is possible for different temperature distributions to be possible in a catalytic converter. There are cases wherein the catalytic converter is considerably hotter in its front area than in its rear area, others with a more even temperature distribution, as well as cases wherein the catalytic converter is hotter in the rear than in the front. This fact adulterates all measuring methods known in the prior art which are based on measuring the thermal energy being released between two measuring areas. The manner of looking at things up to now was based on probes monitoring the volume located between them, while the invention of the instant application, in accordance with the method of finite elements, is based on the probes separately monitoring the partial volume surrounding them and the temperature changes occurring there.

It is, of course, not required for the number of sensors which are necessary therefor to correspond to that of the exemplary embodiment represented herein. Although the accuracy of measurement increases with an increasing number of sensors, to a certain extent the method of the invention is already capable of providing evidence, as mentioned above, if only a single sensor monitors only a single partial volume and compares the derivatives with respect to time and/or the integral of the temperature occurring there during operational changes with set point value ranges and/or previously measured values. The method is suitable for monolithic catalytic converters as well as catalytic converters being formed of several partial bodies and in the same way can include sensors in so-called pre-catalysts or start-up catalysts and/or electrically heatable catalytic converters. The sensors S1, S2, S3, S4 can of course also be utilized for measuring the absolute temperatures and/or the temperature profile in the catalytic converter, at least in a temperature range of, for example, below 500° C. in which most temperature probes still can measure comparatively exactly. For example, such measurements provide information regarding the cold-starting behavior of the catalytic converter. In many cases it can be necessary to disconnect a lambda control during measuring, so that it does not again "level" a purposely applied disruption.

The invention is particularly suited for continuous operational monitoring of catalytic converters in motor vehicles for assuring that strict exhaust gas regulations are adhered to.

We claim:

1. A method for analyzing a condition of a catalytic converter through which a gas mixture flows, which comprises:
    defining at least two partial volumes within a catalytic converter, the partial volumes being axially offset from one another at different axial positions in the catalytic converter along a flow direction of a gas mixture through the catalytic converter;
    measuring a temperature with a sensor at least at one location or in a region within each of the partial volumes of the catalytic converter during a change of at least one of chemical and physical properties of the gas mixture flowing through the catalytic converter;
    selecting the location or the region and a configuration of the sensor for at least approximately representing a reaction of the temperature in each of the partial volumes of the catalytic converter with a reaction of the measured temperature to a change of the properties of the gas mixture;
    determining set point values for the respective change in the properties of the gas mixture on the basis of a thermodynamic model while taking physical boundary conditions and properties of each of the partial volumes into account; and
    determining and comparing the reaction of the measured temperature with the set point values.

2. The method according to claim 1, which comprises:
    observing a derivative of the measured temperature with respect to time as the reaction;
    selecting the locations or the region and the configuration of the sensors for at least approximately representing a chronological change of the temperature in the partial volumes of the catalytic converter with the derivative of the measured temperature with respect to time;
    determining set point values for the respective change of the properties of the gas mixture; and determining and comparing the derivative of the measured temperature in each partial volume with respect to time with the set point values.

3. The method according to claim 2, which comprises determining a maximum of the derivative of the temperature with respect to time during the duration of the change.

4. The method according to claim 3, which comprises comparing the maximum determined in the course of the duration of a change with set point values or maxima previously measured during similar changes.

5. The method according to claim 2, which comprises comparing the derivative of the temperature with respect to time in the partial volume with at least one of previously determined values for identical condition changes of the gas mixture, values determined in another catalytic converter, and set point values determined on the basis of model calculations, in an electronic evaluation device.

6. The method according to claim 2, which comprises registering and analyzing different changes of the derivatives of the temperature with respect to time during different types of changes of the properties of the gas mixture, for obtaining statements regarding the condition of the partial volume with respect to various functions, including converting ability and cold-starting behavior.

7. The method according to claim 2, which comprises purposely disrupting a predetermined, exactly defined condition of an internal combustion engine, and comparing the reaction of the derivatives with respect to time regarding the disruption with predetermined set point value ranges.

8. The method according to claim 27, which comprises disrupting the condition of the internal combustion engine after a prolonged phase of constant output during a phase of load reduction by briefly injecting fuel into at least one combustion chamber while ignition is turned off.

9. The method according to claim 2, which comprises observing effects of a defined transient process of an engine, including a cold-starting phase and an acceleration phase, on the derivatives with respect to time.

10. The method according to claim 1, which comprises observing as an observation signal an integral of the temperature with respect to time over the duration of the respective change as the reaction, and if necessary optionally delaying the observation signal by a reaction delay time occurring in the catalytic converter.

11. The method according to claim 1, which comprises triggering a change at least twice in defined intervals for creating a particular change pattern differing from all other conceivable operational conditions in an internal combustion engine and being recognizable when observing the reaction of the measured temperature.

12. The method according to claim 11, which comprises creating the change pattern as a periodic change, preferably having a frequency of 0.1 to 10 Hz and in particular 0.5 to 2 Hz.

13. The method according to claim 11, which comprises creating the change pattern as an aperiodic change preferably being formed of at least three changes.

14. The method according to claim 11, which comprises creating changes with different strengths.

15. The method according to claim 1, which comprises selecting the change of the properties of the gas mixture as a sudden and brief increase in a content of chemical energy in the gas mixture.

16. The method according to claim 15, which comprises creating the increase in the chemical energy in a phase of otherwise constant or exactly known operational conditions of the catalytic converter, by additionally supplying catalytically convertible components, in particular hydrocarbons.

17. The method according to claim 16, which comprises briefly increasing the chemical energy content of the gas mixture for setting the amount of fuel as well as the ratio of fuel and air with respect to the entire gas mass flow in the catalytic converter to an optimum conversion ability in the volume of the catalytic converter during the duration of the change, in particular for completely converting the amount of fuel over the duration of the change and over the length of the catalytic converter.

18. The method according to claim 1, which comprises placing the catalytic converter downstream of an internal combustion engine having an electronic control in order to clean exhaust gases, wherein the change in the properties of the gas mixture takes place because of an operational change of an internal combustion engine.

19. The method according to claim 18, which comprises briefly increasing the chemical energy content of the gas mixture for setting the amount of fuel as well as the ratio of fuel and air with respect to the entire gas mass flow in the catalytic converter to an optimum conversion ability in the volume of the catalytic converter during the duration of the change, in particular for completely converting the amount of fuel over the duration of the change and over the length of the catalytic converter.

20. The method according to claim 18, which comprises causing a sudden change of the temperature of the gas mixture with the operational change.

21. The method according to claim 18, which comprises suddenly changing the mass flow of the gas mixture as the operational change.

22. The method according to claim 18, which comprises determining set point value ranges with a model function disclosing functional connections of the temperatures in different partial volumes of the catalytic converter with each other and with data of an electronic control of the internal combustion engine for at least one of a respective condition and a respective condition change of the internal combustion engine.

23. The method according to claim 22, which comprises considering tolerances which may result from at least one of inaccuracies of transistors, production tolerances in the catalytic converters and deviations in a mixture preparation of the internal combustion engine, in setting a value of the set point value range.

24. The method according to claim 22, which comprises:
 a) determining a derivative of the temperature with respect to time to be expected for a first partial volume with a model function by calculating an exhaust gas temperature and energy released in the catalytic converter from data available from the engine control, including rpm, mass throughput, supplied amount of fuel and engine temperature;
 b) comparing at least one of the temperature measured in the first partial volume and its derivative with respect to time with the calculated temperature and its derivative with respect to time, while registering deviations outside of a set point value range;
 c) calculating a derivative with respect to time to be expected in a subsequent partial volume with a model function, while taking into consideration data available from the engine control and derivatives with respect to time being measured in the previous partial volumes;
 d) comparing a derivative with respect to time being measured in the subsequent partial volume with the calculated derivative with respect to time, while registering deviations outside of a set point value range; and
 e) determining whether and to what extent the catalytic converter as a whole still provides its functions and which partial volumes are possibly damaged and to what extent, from the registered deviations.

25. The method according to claim 1, which comprises selecting an analyzed partial volume of the catalytic converter to be in a region of an outflow end.

26. The method according to claim 1, which comprises:
 observing a total volume of the catalytic converter, being formed of several partial volumes;
 detecting the condition of each partial volume by determining approximately representative derivatives of the temperature as simultaneously as possible during the changes in the properties of the gas mixture; and
 combining the individual detected conditions into a total picture of a total condition of the catalytic converter.

27. The method according to claim 1, which comprises measuring temperature at a catalytically active layer with each temperature sensor.

28. The method according to claim 27, which comprises placing each temperature sensor in intimate heat contact with a support structure of the catalytic converter, and selectively integrating each temperature sensor into walls of the support structure.

29. The method according to claim 27, which comprises placing each temperature sensor in the flow of the gas mixture for permitting a good heat transfer from the support structure through the gas mixture to the temperature sensor.

30. The method according to claim 1, which comprises selecting a first partial volume to be located in a precatalyst, and selecting second and subsequent partial volumes to be located in different cross-sectional regions or partial bodies of a main catalyst.

31. The method according to claim 1, which comprises carrying out the temperature measurements with punctiform temperature sensors or temperature sensors measuring representatively over a partial volume of the catalytic converter.

32. The method according to claim 1, which comprises turning off a lambda control of the catalytic converter during monitoring.

* * * * *